[11] 3,612,084

| | | | |
|---|---|---|---|
| [72] | Inventor | Aaron Kassel Brooklyn, N.Y. | |
| [21] | Appl. No. | 872,815 | |
| [22] | Filed | Oct. 31, 1969 | |
| [45] | Patented | Oct. 12, 1971 | |
| [73] | Assignee | Technicon Corporation Tarrytown, N.Y. | |

[54] HIGH RELIABILITY FLOW REGULATOR
13 Claims, 2 Drawing Figs.

[52] U.S. Cl. ............................................. 137/81.5
[51] Int. Cl. ............................................. F15c 1/04
[50] Field of Search ..................................... 137/81.5

[56] References Cited
UNITED STATES PATENTS

| 3,091,393 | 5/1963 | Sparrow | 137/81.5 |
| 3,388,713 | 6/1968 | Bjornsen | 137/81.5 |
| 3,417,769 | 12/1968 | Bjornsen et al. | 137/81.5 |
| 3,442,278 | 5/1969 | Petersen | 137/81.5 |
| 3,446,078 | 5/1969 | Bowles et al. | 137/81.5 |
| 3,508,564 | 4/1970 | Nelson | 137/81.5 |
| 3,509,896 | 5/1970 | Bowles | 137/81.5 |
| 3,524,460 | 8/1970 | Bermel | 137/81.5 |

Primary Examiner—Samuel Scott
Attorney—S. P. Tedesco

ABSTRACT: New and improved flow regulator means are provided to maintain the flow of a fluid along a flow path at a substantially constant, predetermined rate and comprise pressure-responsive means to generate an electrical signal proportional to the rate of flow of said fluid along said flow path, means to provide a reference, or set-point electrical signal, means to amplify the difference between said electrical signals and provide an output signal, and means to apply said output signal to flow controller means which take the form of temperature control means, having no moving parts, and are operable in response to said output signal to control the temperature, and accordingly the viscosity and flow rate, of said fluid flowing in said flow path.

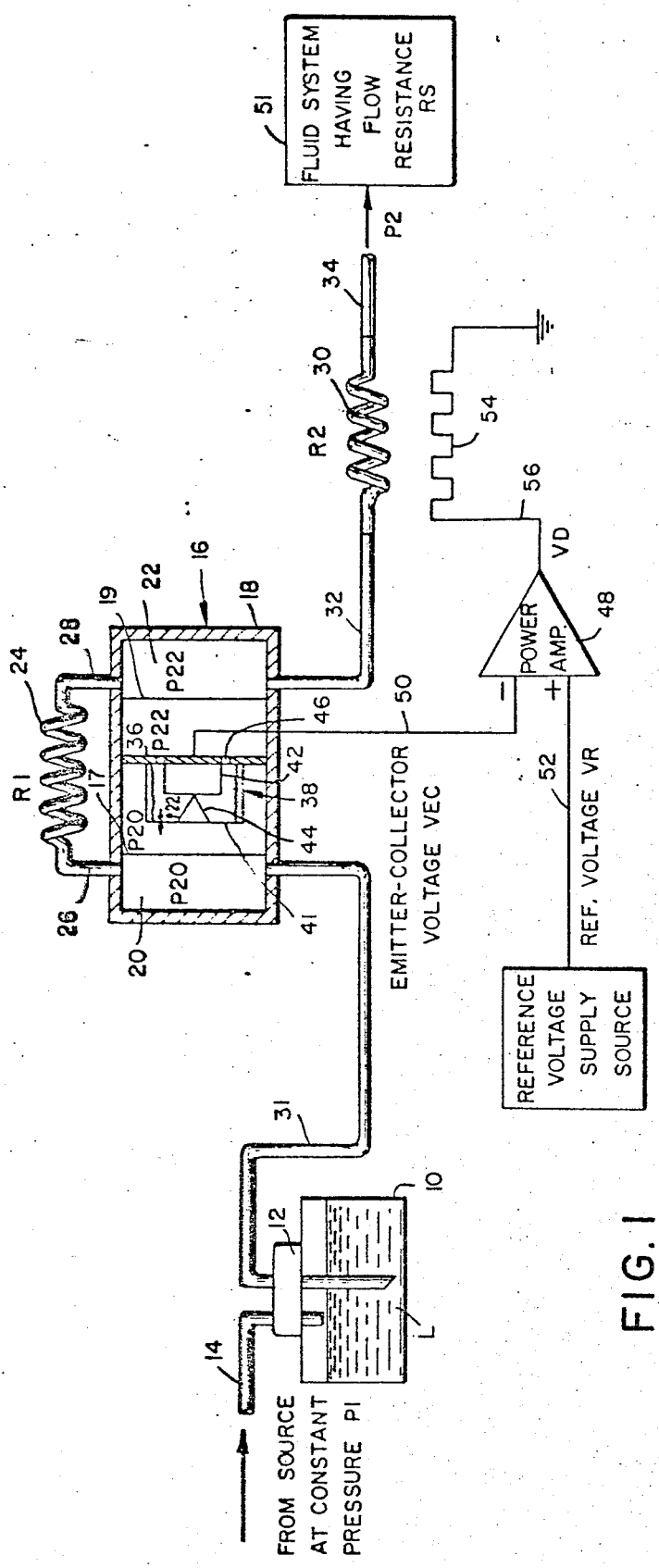
FIG. 1
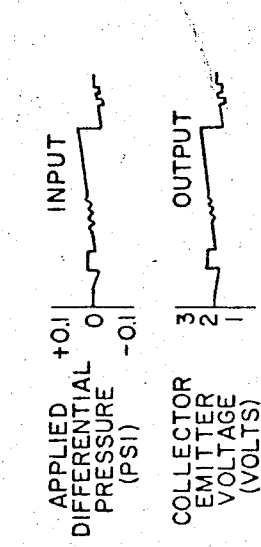
FIG. 2
INVENTOR
AARON KASSEL

HIGH RELIABILITY FLOW REGULATOR

BACKGROUND OF THE INVENTION

1. Field of the Invention

This invention relates to a new and improved high reliability, closed loop flow regulator which is particularly adaptable to the regulation of fluids at low flow rates to maintain the same substantially constant.

2. Description of the Prior Art

Although a wide variety of closed loop flow regulators are known for the regulation of fluid flow to maintain the same at a predetermined, substantially constant flow rate, it may be understood that, in general, the same have been found to be decidedly unsatisfactory for use in improved versions of substantially constant flow rate, automatic fluid sample analysis means in the nature of those shown and described in U.S. Pat. No. 3,241,432, issued Mar. 22, 1966 to Leonard P. Skeggs, et al., which are operable at substantially reduced fluid sample flow rates and fluid sample volumes, respectively, and at substantially increased fluid sample analysis rates. This is to say that for use, for example, in such fluid analysis means for the supply of liquids in the nature of corrosive reagents at predetermined, substantially constant, significantly reduced flow rates, the available flow regulators of the prior art have generally been found to be incapable of providing flow regulation with sufficient accuracy to insure the maintenance of said substantially constant flow rates and/or have proven to be insufficiently reliable for such utilization as a result, in most instances, of the fact that the flow control elements thereof comprise one or more moving parts which must be precisely operable at all times in order to provide satisfactory fluid flow regulation.

More specifically, it may be understood that every closed loop flow regulation system of necessity comprises four major operational components which are; the flow controller, the flow rate signal generation means, the reference or set point signal application means, and the flow rate signal amplifier. In general, the flow controller forms the weakest part of the closed loop flow regulation system in that the former usually takes the form of a pinch valve, variable orifice valve, or mechanically variable flow resistor having at least one moving part to hereby introduce a significant aspect of system unreliability as should be obvious. In addition, the use of a flow controller element having at least one moving part may be understood to give rise to additional difficulty for applications in instances wherein the fluid to be controlled is a substantially corrosive reagent as discussed above in the nature, for example, of an acid, a base, or a solvent.

OBJECTS OF THE INVENTION

It is, accordingly, an object of this invention to provide a new and improved fluid flow regulator for the accurate regulation of fluid flow to maintain the same at a substantially constant, predetermined flow rate in fluid flow systems having relatively low substantially constant fluid flow rates.

Another object of this invention is the provision of a flow regulator including a flow controller element which has no moving parts to maximize the reliability of the flow regulator.

Another object of this invention is the provision of a flow regulator having high sensitivity.

Another object of this invention is the provision of a flow regulator having a wide operational range to render the same readily adaptable, through relatively minor adjustments, to the regulation of a wide variety of different fluids having a wide variety of fluid flow characteristics.

A further object of this invention is the provision of a flow regulator which is particularly adaptable for use in the regulation of the flow of generally corrosive reagents in improved versions of substantially constant flow rate, fluid sample analysis means in the nature of those shown and described in said U.S. Pat. No. 3,241,432.

SUMMARY OF THE INVENTION

As disclosed herein the new and improved, high reliability flow regulator means of the invention are applied to the regulation of a corrosive reagent liquid for supply to an operatively associated, constant flow rate fluid analysis system. The flow regulator means comprise pumping means to pump the reagent liquid at substantially constant pressure through a reference resistor, and pressure sensing means which are operable to sense the pressure drop across said resistor and apply the same to a differential pressure-voltage transducer which takes the form of a pressure sensitive transistor and is operable to generate an output voltage proportional to the pressure drop, and accordingly the flow rate, of said reagent liquid through said reference resistor. A reference voltage and the transducer output voltage, are applied to an amplifier which amplifies the difference therebetween. A flow control element which takes the form of a flow control resistor and an operatively associated temperature control element having no moving parts, is provided downstream of said reference resistor. In operation, the amplified voltage difference is applied to said temperature control element to control the temperature of said flow control resistor, and thus the viscosity and flow rate of the reagent liquid therethrough so as to maintain said flow rate substantially constant despite variations in the flow resistance of said operatively associated fluid analysis system.

DESCRIPTION OF THE DRAWINGS

The above and other objects and significant advantages of this invention are believed made clear by the following detailed description thereof taken in conjunction with the accompanying drawings wherein;

FIG. 1 is a generally schematic diagram depicting a new and improved high reliability flowmeter constructed in accordance with the teachings of this invention; and FIG. 2 is a graph depicting the relationship between the applied differential pressure input of the transducer means of the flow regulator of FIG. 2 and the emitter collector voltage output thereof.

DETAILED DESCRIPTION OF THE INVENTION

Referring now to FIG. 1, a pressure container is indicated at 10 and comprises cap means 12 which are readily removable therefrom to enable the periodic replenishment of the liquid "L" contained therein. By way of example, only, in making clear the particular adaptability of the new and improved flow regulator of the invention to the precise regulation of the flow of corrosive fluids, the liquid L may, for example, be constituted by a corrosive liquid in the nature of a reagent acid.

An inlet conduit 14 extends as indicated from a source of any suitable pressurization fluid in the nature, for example, of nitrogen at constant pressure P1, through the cap means 12 to within the pressure container 10 to pressurize the latter substantially at the said constant pressure P1, as should be obvious.

Signal generation means which, as disclosed herein, take the form of differential pressure-voltage transducer means are indicated generally at 16 and comprise a housing 18. Diaphragm or flexure members 17 and 19 which may be made from any readily available material of suitable strength and corrosion resistant characteristic in the nature, for example, of polyethylene or gold-plated metal, are extended as shown in substantially fluidtight manner across the interior of the housing 18 adjacent opposite end walls thereof to respectively form pressure chambers 20 and 22 within the said housing.

A precisely calibrated, temperature stabilized reference resistor coil 24 having a flow resistance R1, is connected as shown across the housing 18 in such manner that the coil inlet conduit 26 is in fluid flow communication with the outlet of pressure chamber 20, and the coil outlet conduit 28 is in fluid flow communication with the inlet of pressure chamber 22. An outlet conduit 31 extends as shown through the cap means 12 of pressure container 10 in such manner that the inlet end thereof is disposed adjacent the bottom of said pressure container, and the outlet end of conduit 31 is in turn connected as shown to the inlet of pressure chamber 20.

A flow control resistor coil is indicated at 30 and has a fluid flow resistance R2. A conduit 32 extends as shown to connect the outlet of pressure chamber 22 to the inlet of the flow controller coil 30, and a supply conduit 34 is provided to connect the outlet of the flow control resistor 30 as indicated to an associated fluid system 51.

By the above arrangement is believed made clear that a pressure pumping system has been provided wherein the liquid L will be pumped from the pressure container 10 at substantially constant pressure through the pressure chamber 20, the reference resistor 24, the pressure chamber 22, and the flow control resistor 30, respectively, for supply from the outlet of the latter to said associated fluid system 51 through conduit 34, with the flow rate Q thereof being substantially determined by the differential between the respective pressures P1 and P2 and the combined flow resistances of the respective resistors 24 and 30.

More specifically, it may be understood that the liquid flow Q for laminar flow, and resistors of circular cross section, would be in accordance with the Hagen-Poiseulle equation as follows:

$$Q = \frac{P1-P2}{R1 + \frac{128L}{D4}\mu}$$

wherein L and D are respectively the length and internal flow diameter of the flow control resistor 30 and $\mu$ is the absolute viscosity of the liquid L. As a result, it is believed clear that the flow Q is dependent in part upon, and may be readily regulated in accordance with, the liquid viscosity $\mu$ which is, of course, temperature dependent and, for example, for water will vary approximately 2 percent per °C. Thus may be understood that variations in the flow Q may be effectively controlled, within a reasonable range, through effective control of the liquid viscosity $\mu$.

With this in view, and referring again to the differential pressure-voltage transducer means 16 of FIG. 1, the latter may be seen to additionally comprise a mounting plate assembly 36 which extends as shown across the interior of the housing 18 between the respective diaphragms 17 and 19. For purposes made clear hereinbelow, it may be understood that the mounting plate assembly 36 is preferably constructed from any readily available electrically nonconductive material of suitable strength characteristic.

A differential pressure-voltage transducer is indicated schematically at 38 and is supported as shown from the mounting plate assembly 36. For use as disclosed herein, it may be understood that the differential pressure-voltage transducer 38 will preferably take the form of a pressure sensitive transistor or Pitman as manufactured and marketed, for example, by the Stow Laboratories Incorporated of Stow, Mass. Briefly described, such Pitran or piezotransistor is a silicon NPN planar transistor, having the emitter-base junction thereof mechanically coupled to a diaphragm located in the top of the encapsulating can. When a pressure or point force is applied to the diaphragm, it may be understood that a large reversible change is produced in the operating characteristics of the transistor to make possible the provision of an unamplified linear output of at least 20 percent of the supply voltage for use with supply voltages ranging from less than 1 volt to more than 50 volts.

More specifically, and as depicted schematically in cutaway form in FIG. 1, the transducer 38 may be seen to comprise an encapsulating can, the upper wall of which is formed at least in part as shown by a diaphragm 41. The semiconductor wafer is indicated at 42 and force transmitting means 44 are provided to mechanically couple the diaphragm 41 to the emitter-base junction to effect the large reversible change in the transistor operating characteristics as discussed hereinabove in response to flexure of the diaphragm 41. Apertures 46 are formed in the mounting plate assembly 36 to communicate fluid pressure which is substantially the fluid pressure in pressure chamber 22 to the interior of the encapsulating can and thus to the inner surface of the diaphragm 41, while the fact that the outer surface of the latter is arranged as illustrated relative to the inner surface of diaphragm 17 will, of course, insure that the pressure on said outer surface is substantially the fluid pressure in pressure chamber 20. Accordingly, the pressure differential across the diaphragm 41 will substantially correspond to the pressure differential between pressure chamber 20 and pressure chamber 22, and that this pressure differential which is, of course, substantially proportional to the liquid reagent flow rate Q through the reference resistor 24, will be applied in the form of a force from the diaphragm 41 through the force transmitting means 44 to the emitter-base junction of the wafer 42. In addition, by this construction is believed made clear that the wafer 42 will be completely isolated from the corrosive effects of the liquid being pumped through pressure chambers 20 and 22 while nonetheless being substantially exposed to the pressure differential therebetween.

A power amplifier is indicated at 48, and the collector-emitter output voltage VEC from the transducer 38 is applied thereto as indicated by line 50 extending therebetween. The other input to the power amplifier 48 is provided by a reference voltage VR which is applied thereto as indicated from a preferably readily adjustable source 51 along line 52.

A temperature control element is indicated at 54 and is operatively associated with the flow control resistor 30 to control the temperature of the latter and, as follows, of the viscosity of the liquid flowing therethrough. The output voltage VD from the power amplifier 48 is applied as indicated by line 56 to the temperature control element 54 to control the operation of the latter. More specifically, said temperature control element may, for example, take the form of a precisely calibrated, high electrical resistance element, the temperature of which will, of course, be readily controllable through variation in the voltage VD applied thereto on line 56. Alternatively, the temperature control element 54 may take the form of solid-state cooling means in the nature of a bismuth telluride cooling element, the temperature of which would again be readily controllable through appropriate variation in the voltage VD applied thereto on line 56.

In operation for use, for example, in the supply of a corrosive liquid reagent at a predetermined, substantially constant relatively low flow rate in the order of 0.01 ml. per minute to an improved version of automatic blood sample analysis means in the nature of those shown and described in said U.S. Pat. No. 3,241,432, it may be understood that the liquid L would be constituted by said reagent. In addition, the reference voltage VR applied to power amplifier 48 from source 51 would be adjusted relative to the expected emitter-collector voltage VEC—which will be applied thereto on line 50 from the transducer 38 in response to the pressure differential between the pressure in pressure chamber 20, or P20, and the pressure in pressure chamber 22, or P22—to provide a desired voltage difference or VD therebetween under steady state operational conditions. The application of this amplified voltage difference or amplified VD on line 56 to the temperature control element 54 will in turn provide a reagent viscosity $\mu$ which will result in the desired reagent flow rate Q. For such use, it may be understood that the transducer 38, the power amplifier 48, and the temperature control element 54 are preferably arranged so that the latter will function to provide the desired reagent viscosity $\mu$ at a temperature thereof intermediate the operating temperature range of said control element whereby the same can function to both increase and decrease the said reagent viscosity $\mu$ with resultant increase and decrease in the reagent flow rate Q to thus enable appropriate compensation for increases or decreases in the flow resistance RS of the associated fluid system 51 which would otherwise result in corresponding decreases or increases in the said reagent flow rate Q.

More specifically, under normal operating conditions as based upon a normal system flow resistance RS, the flow regulator of the invention would be arranged so that the pressure drop PR1 across the reference resistor 24 which would, of course, be substantially equal to P20−P22, would provide an emitter-collector voltage VEC to the power amplifier 48 of such magnitude that the voltage difference VD, which is, of course, equal to VR−VEC to be amplified by the power amplifier 48 and applied to the temperature control element 54, would be of such magnitude as to provide for a reagent viscosity $\mu$ in the reagent flowing through flow control resistor 30 as would assure the provision of the desired reagent flow rate Q under such conditions.

By way of illustration, if it is assumed, for example, that the temperature control element 54 takes the form of a heating element and that a temporary increase in the flow resistance RS of the associated system occurs, it is believed clear that this will be manifested in an increase in P22 to in turn result in a decrease in PR1 with attendant decrease in VEC, increase in VD, and resultant increase in the temperature of the temperature control element 54 and flow control resistor R2 to thus decrease the reagent viscosity $\mu$ with resultant return of the reagent flow rate Q to the desired level as should be obvious. Conversely, it may be understood that a temporary decrease in the system flow resistance RS will result in a decrease in pressure P22 with attendant increase in PR1, increase in the emitter-collector voltage VEC, decrease in the amplified voltage difference VD, and decrease in the temperature of temperature control element 54, respectively, with attendant increase in the viscosity $\mu$ of the reagent flowing through flow control resistor R2 and resultant return of the reagent flow rate Q to the desired level as should again be obvious. If, in the alternative, the temperature control element 54 takes the form of a solid-state cooling element as discussed hereinabove and wherein the temperature of the same decreases in response to an increase in the operating voltage provided thereto, it may be understood that a simple rearrangement of the control circuitry as depicted in FIG. 1 would suffice to insure appropriate decrease in the viscosity of the reagent flowing through flow control resistor R2 in response to an increase in the system flow resistance RS, and vice versa.

Referring now to FIG. 2, it may be seen that the changes in the collector-emitter voltage output of the transducer 38 follow extremely closely the changes in the applied differential pressure input applied thereto, whereby is believed made clear that VEC as applied on line 50 to the power amplifier 48 will be precisely related to the changes in the pressure drop PR1 across the reference resistor R1—which pressure drop is, as discussed hereinabove, proportional to the liquid reagent flow rate Q through the said reference resistor—to thus insure high accuracy of flow regulator operation within the pressure differential ranges encompassed by the pressure differential input curve of FIG. 2.

For use as described hereinabove, it may be understood that the flow resistance of the flow control resistor R2 would preferably be made larger than the combined flow resistance of the reference resistor R1 plus the system flow resistance RS to insure adequate dynamic range for the flow regulator of the invention. In addition, the reference voltage VR would preferably be factory preset to provide for a desired reagent flow Q with a specific reagent at a specific pressure P1 through a reference resistor R1 and a flow control resistor R2 having respectively precalibrated fluid flow resistances at ambient and predetermined temperature control element temperatures, respectively.

Of particular advantage with regard to the flow regulator of the invention is the fact that the flow control element thereof which is, of course, constituted by the flow control resistor R2 and the operatively associated temperature control element 54, requires no moving parts to thus provide for significantly increased reliability and significant decrease in flow controller element complexity and cost as should be obvious. More specifically, and for use with corrosive reagent liquids in the nature, for example, of sulfuric or hydrochloric acid solutions, it may be understood that choice of flow control resistor materials in the nature of glass, quartz or ceramics having suitable corrosion resistant and heat conductivity characteristics, without regard to the mechanical properties thereof, will suffice to insure the significant advantages discussed hereinabove. This may be readily contrasted with the representative flow regulators of the prior art, as discussed hereinabove, which for example require the use of pinch valves, variable resistors or the like in the formation of the flow control element, and would thus require detailed consideration of both the mechanical and chemical properties of the element materials to significant design disadvantage.

In addition, it may be understood that proper choice of power amplifier 48 to provide for appropriate amplification of VR−VEC VEC will enable the provision of suitably high flow regulator sensitivity with a frequency response which would be more than adequate for the currently contemplated applications of the flow regulator of the invention. Too, since for a typical reagent liquid a 20° C. change in the temperature of the temperature control element 54 and accordingly of the flow control resistor R2, will effect a sufficient change in the viscosity $\mu$ of the reagent liquid to result in an approximately 40 percent change in the reagent liquid flow rate Q, it may be understood that the operational range of the flow regulator of the invention will be extremely wide to further significant advantage as should be obvious.

It is also believed clear that the flow regulator of the invention embodies significant versatility in that the same can readily be modified through proper adjustment in the reference voltage VR to accurately control the flow of a wide range of reagents having substantially different viscosities at the same temperature. More specifically, it is believed clear that increase in the reference voltage VR will enable the regulation of the flow of reagents having higher viscosities at the same operating temperature of control element 54, while decrease in the reference voltage VR will enable the regulation of the flow of reagents having lower viscosities at the same operating temperature of the control element 54.

Although disclosed by way of example hereinabove as applied to the regulation of the flow of reagent liquids to automatic fluid analysis systems, it is believed clear that the new and improved flow regulator of the invention is, of course, applicable to the regulation of the flow of a wide variety of liquids other and different than said reagent liquids in a wide variety of fluid systems other and different than said fluid analysis systems. In addition, it is believed equally clear that through suitable modification in the disclosed pressure pumping means, the new and improved flow regulator of the invention would also be applicable to the regulation of the flow of gases. Too, although disclosed hereinabove as comprising diaphragms 17 and 19 to isolate transducer 38 from the corrosive reagent liquid L, it may be understood that said diaphragms could be eliminated, and the respective pressures P20 and P22 applied directly to opposite faces of the Pitran diaphragm 41 in obvious manner in the event that the fluid being regulated was not corrosive.

While I have shown and described the preferred embodiment of my invention, it will be understood that the invention may be embodied otherwise than as herein specifically illustrated or described, and that certain changes in the form and arrangement of parts and in the specific manner of practicing the invention may be made without departing from the underlying idea or principles of this invention within the scope of the appended claims.

What is claimed is:

1. A flow regulation system comprising means for passing fluid along a flow path at a substantially constant rate, means to provide a signal indicative of the fluid flow rate along said path, and flow controller means operable in response to said signal to maintain said fluid flow along said path at said substantially constant rate, said flow controller means forming a first portion of said flow path and temperature control means operatively associated with said first portion and responsive to said signal for controlling the temperature and, accordingly, the viscosity and flow rate of said fluid flowing through said first portion, so as to maintain said fluid flow along said flow path at said substantially constant rate.

2. A flow regulator as in claim 1 wherein, said means forming said first portion of said flow path comprise a flow control resistor.

3. A flow regulator as in claim 1 wherein, said means to provide a signal indicative of said fluid flow rate comprise means forming a second portion of said flow path, and pressure sensing means operatively associated therewith and operable to sense the pressure drop across said second portion of said flow path portion.

4. A flow regulator as in claim 3 wherein, said means to provide a signal indicative of said fluid flow rate further comprise, differential pressure-voltage transducer means for providing an output voltage indicative of said pressure drop across said portion of said flow path.

5. A flow regulator as in claim 4 wherein, said differential pressure-voltage transducer means comprise a pressure sensitive transistor which includes a pressure sensitive diaphragm, and said means to provide said transducer output voltage comprise means to respectively apply the pressures upstream and downstream of said flow path portion to opposite sides of said transistor diaphragm.

6. A flow regulator as in claim 5 wherein, said pressure application means comprise, a first pressure chamber formed upstream of said flow path portion, a second pressure chamber formed downstream of said flow path portion, a first diaphragm forming one wall of said first chamber with one surface of said first diaphragm being subjected to the pressure in said first pressure chamber, a second diaphragm forming one wall of said second pressure chamber with one surface of the said second diaphragm being subjected to the pressure in said second pressure chamber, means disposing said pressure sensitive transistor intermediate said first and second diaphragms, to isolate the same from said first and second pressure chambers but in such manner that the pressure from said first pressure chamber will be applied to one surface of said transistor diaphragm and the pressure from said second pressure chamber will be applied to the other surface of said transistor diaphragm.

7. A flow regulator as in claim 4 wherein, said means to provide a signal indicative of said fluid flow rate further comprise, amplifier means, means to provide a reference or set point voltage to said amplifier as one input thereof, means to apply said output voltage from said transducer means as another input to said amplifier means whereby, the output of said amplifier means will be constituted by the amplified voltage difference between said reference voltage and transducer means output voltage, respectively.

8. A flow regulator as in claim 7 wherein, said flow controller means comprise, means forming another portion of said flow path, temperature control means operatively associated therewith and operable to control the temperature, and accordingly the viscosity and flow rate of said fluid flowing therethrough, and means to apply said amplified voltage difference to said temperature control means to operate the same.

9. A flow regulator as in claim 8 wherein, said another portion of said flow path is disposed downstream of said portion of said flow path.

10. A flow regulator as in claim 9 wherein, said another portion of said flow path comprises a flow control resistor.

11. A flow regulator as in claim 10 wherein, said portion of said flow path comprises a reference resistor.

12. A flow regulator as in claim 11 wherein, said differential pressure-voltage transducer means comprise a pressure sensitive transistor which includes a pressure sensitive diaphragm, and said means to provide said transducer output voltage comprise means to respectively apply the pressures upstream and downstream of said flow path portion to opposite sides of said transistor diaphragm.

13. A flow regulator as in claim 12 wherein, said pressure application means comprise, a first pressure chamber formed upstream of said flow path portion, a second pressure chamber formed downstream of said flow path portion, a first diaphragm forming one wall of said first chamber with one surface of said first diaphragm being subjected to the pressure in said first pressure chamber, a second diaphragm forming one wall of said second pressure chamber with one surface of the said second diaphragm being subjected to the pressure in said second pressure chamber, means disposing said pressure sensitive transistor intermediate said first and second diaphragms, to isolate the same from said first and second pressure chambers but in such manner that the pressure from said first pressure chamber will be applied to one surface of said transistor diaphragm and the pressure from said second pressure chamber will be applied to the other surface of said transistor diaphragm.